Nov. 22, 1938.  C. W. SONDERN ET AL  2,137,638
ALUMINUM HYDROXIDE HYDROGEL AND PROCESS FOR MAKING IT
Filed Aug. 13, 1937
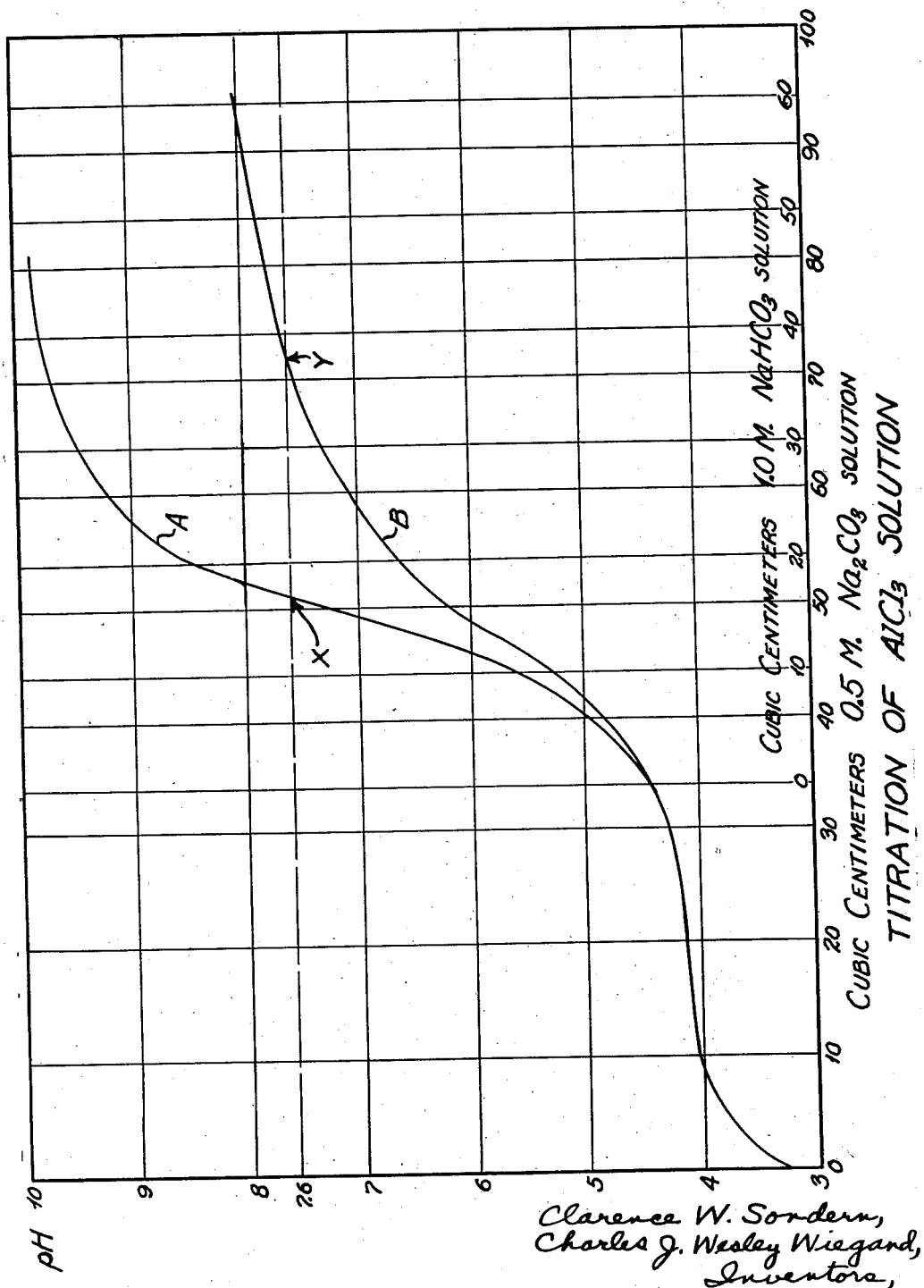
Clarence W. Sondern,
Charles J. Wesley Wiegand,
Inventors,
Delos G. Haynes,
Attorney Patented Nov. 22, 1938

2,137,638

UNITED STATES PATENT OFFICE 2,137,638

ALUMINUM HYDROXIDE HYDROGEL AND PROCESS FOR MAKING IT

Clarence W. Sondern and Charles J. Wesley Wiegand, Kansas City, Mo., assignors to George A. Breon & Company, Inc., Kansas City, Mo., a corporation of Missouri Application August 13, 1937, Serial No. 158,882

6 Claims. (Cl. 23—143)

This invention relates to an aluminum hydroxide hydrogel, and with regard to certain more specific features, to an aluminum hydroxide hydrogel of medicinal utility, and to a process for making it.

Among the several objects of the invention may be noted the provision of a hydrogel of aluminum hydroxide, as a new composition of matter, which hydrogel has an improved ability to combine with acids or to be neutralized thereby, said hydrogel being therefore useful medicinally for the treatment of conditions of hyperacidity in which the administration of a neutralizing substance is indicated, such as in the treatment of hyperchlorhydria; the provision of a hydrogel of aluminum hydroxide which retains its activity, in respect to its combining power with acids, over prolonged periods of time, and which accordingly may be stored and dispensed in the usual manner; the provision of a hydrogel of aluminum hydroxide which is of pleasant flavor and odor, and which can be administered with facility; and the provision of a method for making a hydrogel of aluminum hydroxide having the aforementioned characteristics in an economical manner. Other objects will be in part obvious and in part pointed out hereinafter.

The invention accordingly comprises the elements and combinations of elements, steps and sequence of steps, and features of composition and synthesis, which will be exemplified in the products and processes hereinafter described, and the scope of the application of which will be indicated in the following claims.

The accompanying drawing is a graphical titration curve, the significance of which will be explained in greater detail hereinafter.

Aluminum hydroxide in its various physico-chemical forms has heretofore been used as a therapeutic antacid agent in many instances. However, its use as an antacid agent has been restricted because of the low combining power of the previously available forms of aluminum hydroxide, with respect to the acids it is expected to neutralize. With the said previous forms, it has been found that by no means does a molecular reaction take place, probably because of the inertness of the aluminum hydroxide.

A principal object of the present invention, accordingly, is the provision of aluminum hydroxide in such a form that it has a high degree of activity or high combining power for the acid it is intended to neutralize. This improved combining power is brought about, in the present invention, by supplying the aluminum hydroxide in the form of a hydrogel, which, it is believed, is a new physico-chemical form of aluminum hydroxide heretofore never achieved. The properties of this aluminum hydroxide hydrogel are set forth in greater detail hereinafter.

We commence by preparing an aqueous solution of any suitable aluminum salt of a mineral or common organic acid, such as aluminum nitrate, aluminum sulphate, aluminum acetate, aluminum chloride, and the like. Because of its ready availability in pure form, we prefer to use aluminum chloride, and hence the description of the method of the present invention will be confined to this salt, although the others mentioned have been used with satisfaction. In starting the method, we titrate or commence the neutralization of the aluminum chloride solution with an aqueous solution of a soluble carbonate, preferably sodium carbonate. However, other alkali carbonates such as potassium carbonate and ammonium carbonate, may be used successfully.

Curve A in the accompanying graph is a titration curve showing the pH changes occurring when a solution of aluminum chloride is titrated with sodium carbonate solution. The characteristic break in this curve at a pH value of 7.6 (indicated by X) is the point of complete neutralization. Thus, if the addition of precipitating agent is halted before that pH is attained, the reaction is incomplete and the resulting aluminum hydroxide product has an astringent taste. If the reaction is halted at a pH of 7.6, the precipitation is complete and the resulting hydrogel has a salty but non-astringent taste.

It is apparent from curve A that difficulty would be experienced in bringing the reaction exactly to completion by the addition merely of sodium carbonate solution. Furthermore, excesses of sodium carbonate result in a resolution of the precipitate. In order to evade this difficulty, we adopt a procedure which comprises partially neutralizing the aluminum chloride with sodium carbonate, and then completing the neutralization with an aqueous solution of sodium or another alkali bicarbonate. Curve B in the accompanying graph is a typical curve for such a titration procedure. Curve B represents a titration of a solution of aluminum chloride first with sodium carbonate solution up to a point of approximately 66% neutralization of the aluminum chloride, and thereafter titration with a solution of sodium bicarbonate of a normality equivalent to that of the sodium carbonate, to a point of complete neutralization indicated by Y. It will of course be understood that up to the point of 66% neutralization, curves A and B are identical. The magnitude of the pH of the solution ultimately attainable in either case can be seen from the limits of the curves. In a procedure such as that represented by curve B, it is clearly recognized that the final pH approaches that of a solution of sodium bicarbonate and is limited to a value of approximately 8.0, whereas in the case depicted by curve A, the pH of the solution may rise to a value of 10 to 11. The procedure of curve B therefore automatically restricts the pH that is attainable during the precipitation. At the same time, the procedure of curve B results in a more gradual precipitation, which in turn results in the production of a product wherein the aluminum hydroxide is of extremely fine particle size.

The point at which the addition of sodium carbonate is discontinued, and the addition of sodium bicarbonate commenced, may apparently be varied between rather wide limits. For example, as a lower limit, the neutralization with sodium carbonate may be stopped at 60% of completion; as an upper limit, the neutralization with sodium carbonate may be extended to a point of approximately 90% of completion, after which the addition of the sodium bicarbonate gently brings about the final stages of the precipitation.

The following equations indicate the probable course of the chemical reactions involved in the preparation of this product:

$$2AlCl_3 + 3Na_2CO_3 \rightarrow Al_2(CO_3)_3 + 6NaCl$$
$$AlCl_3 + 3NaHCO_3 \rightarrow Al(HCO_3)_3 + 3NaCl$$
$$Al_2(CO_3)_3 + 6H_2O \rightarrow 2Al(OH)_3 + 3H_2CO_3$$
$$Al(HCO_3)_3 + 3H_2O \rightarrow Al(OH)_3 + 3H_2CO_3$$

The following example shows specifically how the procedure of the present invention may be satisfactorily carried out.

Ten pounds of hydrated aluminum chloride (N. F. VI. purity) are dissolved in 10 gallons of hot water and the solution is filtered. To this solution is slowly added a solution of 6.8 pounds of sodium carbonate monohydrate dissolved in 3 gallons of hot water. Care is taken that the temperature does not exceed 70° C. at the time when the addition of the carbonate solution is started. During the addition of the sodium carbonate solution, the pH rises to a value of 4.5 to 6. During this phase of the process, the solution is stirred continuously and vigorously, preferably with a mechanical stirrer or agitator. After the last of the sodium carbonate solution has been added, stirring is continued for about one hour more and the mixture is then allowed to stand over night. After thus standing, the pH of the reaction mixture should be within the range of 4.5 to 6.5.

The following day, a freshly prepared solution of 3 to 4 pounds of sodium bicarbonate in 2 to 3 gallons of water is slowly added to the reaction mixture until it attains a pH of 7.0 to 7.3. As in the first phase of the reaction, continuous stirring is preferable. After the addition of the sodium bicarbonate solution, the stirring is preferably continued for the order of two hours more, and the mixture is then allowed again to stand over night. The following day, the pH of the solution will be found to have increased to a value of 7.6 to 8.0.

The precipitate of aluminum hydroxide hydrogel is then collected as a cake in a centrifuge or other suitable filtering device, and the filter cake is then washed with water until the sodium chloride content is less than the order of 1%. After the washing, the dewatering operation is continued until a soft cake is obtained. At this stage, the hydrogel will be found to contain between 8 and 15% aluminum hydroxide.

The cake is then removed from the centrifuge or other filtering device and placed in a suitable mixer. When it is thoroughly mixed, a smooth semi-liquid mass results. At this stage, whatever water is necessary to obtain the desired aluminum hydroxide content of the finished product is added, and finally, if desired, a flavoring substance may be added. The mixing is continued until a smooth paste or cream-like mass is obtained.

At this stage the hydrogel product may be filled into containers. Upon standing for several hours the product "sets up" to a stiff paste. In this respect, the product exhibits the properties of a thixotropic gel.

As a flavor, we prefer to employ small quantities of oil of peppermint, such as 0.005% to 0.02%. Other flavoring substances may be employed as well.

The diameter of the individual particles of aluminum hydroxide hydrogel in the mass, ascertained microscopically, appears to be of the order of 3.5 to 5 microns.

The product as thus prepared corresponds in composition to the following specification:

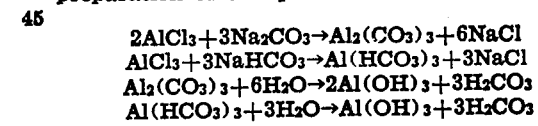

| | |
|---|---|
| Aluminum (calculated as Al(OH)$_3$) | 8 to 15%, 10% being preferred |
| Chlorine (calculated as sodium chloride) | 1.0 to 1.8% |
| Carbonate (calculated as CO$_2$) | 2.0 to 1.5% |
| Oil of peppermint | approximately 0.005% |
| Bound water (by Willstaetter method) | 40 to 50% |
| pH | 7.4 to 8.0 |

The foregoing analysis is run on the gel itself, as many of the desired properties of the gel are lost if the product is dessicated.

In the following table are contained data comparing the acid-combining power of the product of the present invention, prepared as above described (after aging for one month) with powdered alluminum hydroxide of U. S. P. IX and C. P. quality. The columns "milli-equivalents of HCl consumed" indicate the relative ability of the material to react with hydrochloric acid. Equal weights of aluminum hydroxide were used in all experiments. The samples were placed in a flask containing a definite quantity of tenth-normal hydrochloric acid and shaken. The excess hydrochloric acid was titrated after the expiration of the required time with tenth-normal sodium hydroxide, using p-dimethylaminoazobenzene (Toepfer's reagent) for the indicator. The results show that the prior materials do not react appreciably with hydrochloric acid, whereas the hydrogel of the present invention reacts rapidly and completely with said acid.

| Sample | Weight sample | Time | C. c. HCl (0.1046N) | C. c. NaOH (0.0990N) | Milli-equivalents HCl consumed |
|---|---|---|---|---|---|
| | *Grams* | | | | |
| Aluminum hydroxide, U. S. P. IX | | | 25.00 | 26.42 | |
| | 0.25 | 5 min. | 25.00 | 26.38 | 0.00 |
| | 0.25 | 30 min. | 25.00 | 26.43 | 0.00 |
| | 0.25 | 4 hrs. | 25.00 | 26.45 | 0.00 |
| Aluminum hydroxide, C. P. | | | 25.00 | 26.42 | |
| | 0.25 | 5 min. | 25.00 | 26.45 | 0.00 |
| | 0.25 | 30 min. | 25.00 | 26.20 | 0.002 |
| | 0.25 | 3 hrs. | 25.00 | 26.40 | 0.00 |
| | 0.25 | 20 hrs. | 25.00 | 26.42 | 0.00 |
| Hydrogel of present invention (13.7% Al(OH)₃) | | | 25.00 | 26.42 | |
| | 1.85 | 5 min. | 25.00 | 6.95 | 1.93 |
| | 1.85 | 10 min. | 25.00 | 4.05 | 2.22 |
| | 1.85 | 20 min. | 25.00 | 2.63 | 2.36 |
| | 1.85 | 1 hr. | 25.00 | 0.20 | 2.60 |
| | 1.85 | 2 hrs. | 25.00 | 0.43 | 2.58 |

The small carbonate content as revealed by the above analysis is apparently important to the character of the products of the present invention. It is quite possible that it is necessary to have a carbonate present during the manufacture of the material, and it is also quite possible that the prolonged activity of the ultimate product hydrogen is at least in part dependent upon the presence of appreciable although small amounts of aluminum carbonates therein. This possibility is supported by the fact that the activated form of precipitated hydrogel can be converted readily to an inactive form if a slurry of the hydrogen is boiled for a short time. Furthermore, if the solutions are boiled during the precipitation period the resulting product is of an inactive rather than an active form. Both of these are typical reactions of carbonates and more particularly of the carbonate salts of weak bases, in which complete hydrolysis results in the loss of carbon dioxide. It is accordingly possible that the product of the present invention may be considered at least in part as an incompletely hydrolyzed aluminum carbonate, rather than as a pure aluminum hydroxide.

For lack of a more suitable scale or standard, we arbitrarily designate as the "combining power" of the product of the present invention, and comparable aluminum hydroxide preparations, if any, the number of milli-equivalents of hydrochloric acid that a sample of the product containing one gram of Al(OH)₃ will neutralize in a time interval of one hour, as determined by mixing a known amount of the product (in which the per cent. content of Al(OH)₃ is known) with a known amount of hydrochloric acid, allowing one hour to elapse, and then determining the amount of uncombined hydrochloric acid by titration with sodium hydroxide of known concentration, using as an indicator p-dimethylaminoazobenzene (Toepfer's reagent). Using this method, the "combining power" of the product of the present invention may be calculated from the data given in the table supra, as the order of 10. So far as we know, no aluminum hydroxide ever heretofore prepared has had a "combining power" even remotely approximating this value of 10.

In view of the above, it will be seen that the several objects of the invention are achieved and other advantageous results attained.

As many changes could be made in carrying out the above compositions and processes without departing from the scope of the invention, it is intended that all matter contained in the above description shall be interpreted as illustrative and not in a limiting sense.

We claim:
1. A hydrogel of aluminum hydroxide containing a relatively small amount of incompletely hydrolyzed aluminum carbonate.
2. The method of preparing an aluminum hydroxide hydrogel which comprises neutralizing an aqueous solution of an aluminum salt with an alkali carbonate to the order of 60 to 90% of complete neutralization, and then completing the neutralization of said solution with an alkali bicarbonate.
3. The method of preparing an aluminum hydroxide hydrogel which comprises neutralizing an aqueous solution of an aluminum salt with an alkali carbonate to the order of 60 to 90% of complete neutralization, and then completing the neutralization of said solution with an alkali bicarbonate, in order to precipitate aluminum hydroxide therefrom, and thereafter filtering and washing the precipitated aluminum hydroxide.
4. The method of preparing an aluminum hydroxide hydrogel which comprises neutralizing an aqueous solution of an aluminum salt with an alkali carbonate to the order of 60 to 90% of complete neutralization, and then completing the neutralization of said solution with an alkali bicarbonate, in order to precipitate aluminum hydroxide hydrogel therefrom, and thereafter filtering and washing the precipitated aluminum hydroxide hydrogel, but maintaining the water content of the filtered material such that it contains from the order of 8% to the order of 15% aluminum hydroxide.
5. The method of preparing a hydrogel of aluminum hydroxide, which comprises preparing an aqueous solution of an aluminum salt, adding an aqueous solution of an alkali carbonate to said aluminum salt solution until the pH of the resultant mixture is the order of 4.5 to 6, allowing the mixture to stand until its pH is the order of 4.5 to 6.5, and thereafter adding to the mixture an aqueous solution of an alkali bicarbonate until the mixture has a pH of the order of 7.0 to 7.3, and thereafter allowing the mixture to stand until its pH is the order of 7.6 to 8.0.
6. The method of preparing a hydrogel of aluminum hydroxide, which comprises preparing an aqueous solution of an aluminum salt, adding an aqueous solution of an alkali carbonate to said aluminum salt solution until the pH of the resultant mixture is the order of 4.5 to 6, allowing the mixture to stand until its pH is the order of 4.5 to 6.5, and thereafter adding to the mixture an aqueous solution of an alkali bicarbonate until the mixture has a pH of the order of 7.0 to 7.3, and thereafter allowing the mixture to stand until its pH is the order of 7.6 to 8.0, and finally filtering the precipitate so formed to obtain a hydrogel having of the order of 8 to the order of 15% aluminum hydroxide content.

CLARENCE W. SONDERN.
CHARLES J. WESLEY WIEGAND.